United States Patent [19]

Thornton et al.

[11] Patent Number: 5,011,183
[45] Date of Patent: Apr. 30, 1991

[54] BAG, AIRBAG, AND METHOD OF MAKING THE SAME

[75] Inventors: Peter B. Thornton, Bronxville; Fred P. Woodworth, Arkpport; Stanley H. Cone, Hornell, all of N.Y.

[73] Assignee: Stern & Stern Industries, Inc., New York, N.Y.

[21] Appl. No.: 535,772

[22] Filed: Jun. 8, 1990

[51] Int. Cl.$^5$ ............................................. B60R 21/20
[52] U.S. Cl. ................................. 280/743; 139/389; 383/109; 280/728; 428/137
[58] Field of Search ............... 280/728, 743, 739; 139/389; 383/107, 109; 428/137

[56] References Cited

U.S. PATENT DOCUMENTS

| | | | |
|---|---|---|---|
| 592,057 | 10/1897 | Knight | 139/389 |
| 2,169,638 | 8/1939 | Gilfillan | 383/108 |
| 2,525,139 | 10/1950 | Ligon | 493/194 |
| 3,360,014 | 12/1967 | Poisson et al. | 139/389 |
| 3,544,404 | 12/1970 | Johnson et al. | 156/148 |
| 3,776,798 | 12/1973 | Milano | 156/269 |
| 3,892,425 | 7/1975 | Sakairi et al. | 280/743 |
| 3,935,810 | 2/1976 | Milano | 99/467 |
| 4,213,634 | 7/1980 | Hoshino et al. | 280/728 |
| 4,921,735 | 5/1990 | Bloch | 280/743 |
| 4,963,412 | 10/1990 | Kokeguchi | 428/137 |

Primary Examiner—Kenneth R. Rice
Attorney, Agent, or Firm—Amster, Rothstein & Ebenstein

[57] ABSTRACT

A bag suitable for use in a vehicular airbag comprises a seamless bag of integral, unitary, one-piece woven construction. The bag defines a pair of opposed panels of substantial area formed in a plain weave of a first yarn density. A single intermediate margin of slight width joins the peripheries of the opposed panels together, the intermediate margin being formed in a plain interweave of a second yarn density greater than the first yarn density. A single outer margin of substantially greater width than the intermediate margin extends about the periphery of the intermediate margin, the outer margin being formed in a weave looser than the plain interweave. The airbag is made by inverting the bag and positioning inflation means in gaseous communication with the interior of the inverted bag for inflating the inverted bag.

19 Claims, 3 Drawing Sheets

BAG, AIRBAG, AND METHOD OF MAKING THE SAME

BACKGROUND OF THE INVENTION

The present invention relates to airbags for use in vehicles as a passive passenger restraint in the event of an accident, and more particularly for seamless woven bags suitable for use therein and methods of making the same.

An airbag is typically made with a bag which is formed by sewing or stitching together a pair of separate and distinct panels or by folding over an oversize piece of material and stitching the free edges thereof together. In either case, the cost of manufacturing the bag far exceeds the cost of weaving the bag due to the need for the seaming operation (i.e., stitching or sewing) and the additional time required to perform that operation. Equally important, while the weaving of the bag is a reliable and dependable operation requiring only minimal quality control, the seaming operation is greatly less predictable and reliable and indeed necessitates extensive and careful inspection procedures to ensure that the finished bag meets its specifications. These inspection procedures further increase the final cost of the bag.

Seamless bags of integral, unitary, one-piece woven construction are known. For example, U.S. Pat. Nos. 592,057; 3,340,919; 3,360,014; and 3,544,404 describe bags which are useful for containing granular solid material such as sand, coffee, food grains and the like. Each of these patents discloses designs which relate to the ability of the bag to hold a great quantity of weight (e.g., sand), the need to open and fill the bag (e.g., by opening the bag at one of the edges thereof), and the problems that result from stressing of the woven material where the two panels join together (variously referred to as the uniting band, the single ply cutting strip, the double thickness single layer fabric portion, or the single thickness strip).

Such prior art seamless bags are not suitable for use in airbags, however, and the design considerations applicable to airbags differ from those applicable to sand bags and the like. For example, typically an airbag must have a low Frazier porosity (e.g., less than eight cubic feet per minute (CFM) for a Passenger side airbag and less than 2 CFM for a driver side airbag) and must be capable of being rapidly inflated with nitrogen or other gas (e.g., within one hundred milliseconds) and then deflating. To this end, a uniform distribution of permeability is crucial. Therefore, the uniting band must not suffer combing or windowing—i.e., the formation of gaps in the yarn under stress as a result of compaction—as such gaps would permit gases to flow therethrough. A non-uniform permeability about the interface between the separate panel areas, on the one hand, and the uniting band thereabout, on the other hand, such as might result from combing or windowing, would present a problem because hot gases (about 1000° F.) could concentrate at stress points exhibiting gaps or small holes and cause melting failures. Accordingly, a bag suitable for use in an airbag should not allow substantial compression of gases to occur in that interface area.

Additionally, an airbag does not have an opening at one of the edges, but rather a hole cut into the center of one of the opposed panels for subsequent attachment of an inflating device.

Accordingly, it is an object of the present invention to provide a seamless bag of integral, unitary, one-piece woven construction suitable for use in an airbag.

Another object is to provide an airbag using such a seamless bag.

A further object is to provide a method of making such a seamless bag.

SUMMARY OF THE INVENTION

It is now found that the above and related objects of the present invention are obtained in a bag suitable for use in an airbag comprising a seamless bag of integral, unitary, onepiece woven construction. The bag defines a pair of opposed panels of substantial area formed in a plain weave of a first yarn density. A single intermediate margin of slight width joins the peripheries of the opposed panels together, the intermediate margin being formed in a plain interweave of a second yarn density greater than the first yarn density. A single outer margin of substantially greater width than the intermediate margin extends about the periphery of the intermediate margin, the outer margin being formed in a weave looser than the plain interweave.

In a preferred embodiment, the bag has a Frazier porosity of less than 8 cubic feet per minute and is devoid of any sewing or stitching. Each of the opposed panels is of substantially rectangular configuration and has a width substantially greater than the width of the outer margin. The second yarn density is twice the first yarn density—i.e., the first yarn density is about 45×45 and the second yarn density is about 90×90. The intermediate margin has a total of about 4 ends and 4 picks and a width of about 2.0 mm. The outer margin is formed in a non-plain weave, preferably a single/triple weave, and has a width of about 6.0 mm and a yarn density about equal to the second yarn density.

The present invention also encompasses an airbag in which the seamless bag is inverted and inflation means are in gaseous communication with the interior of the inverted bag for inflating the inverted bag. Preferably the inflation means is in gaseous communication with the interior of the inverted bag through an aperture formed in one of the opposed panels.

The present invention further encompasses a method of making the bag for an airbag by weaving a seamless bag of integral, unitary, onepiece woven construction having a Frazier porosity of less than 8 cubic feet per minute (as described above). Preferably a plurality of the bags are woven, with each of the bags being connected to at least one other bag by a common side of their respective outer margins, and each bag is then separated from the at least one other bag by cutting the common side of their respective outer margins.

The present invention finally encompasses a method of making an airbag from the bag by inverting the bag, and positioning inflation means in gaseous communication with the interior of the inverted bag for inflating the inverted bag.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
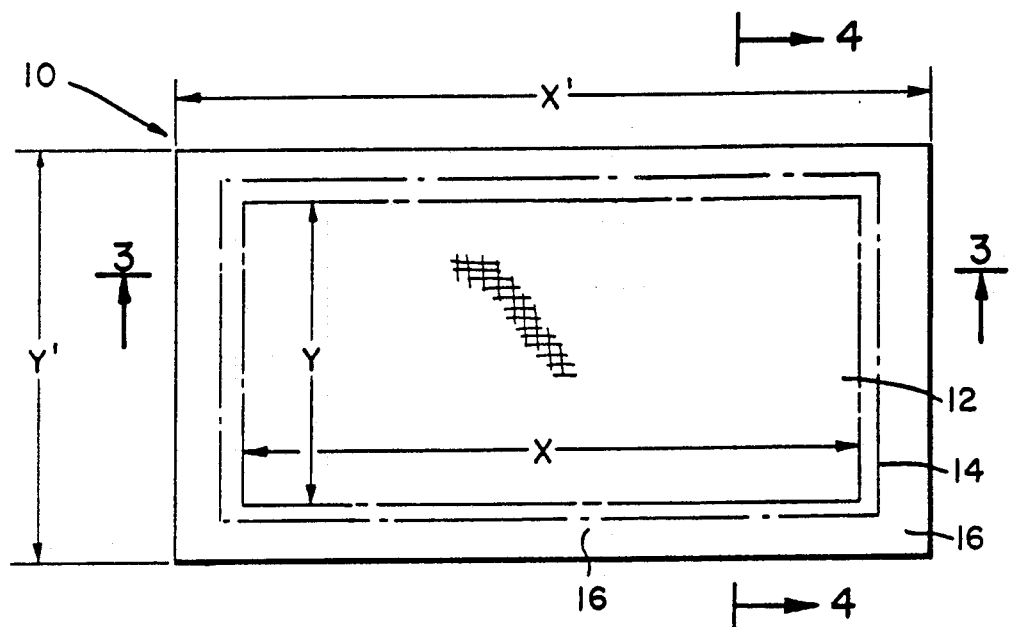
FIG. 1 is a front elevation view of a bag according to the present invention.
Figure 2:
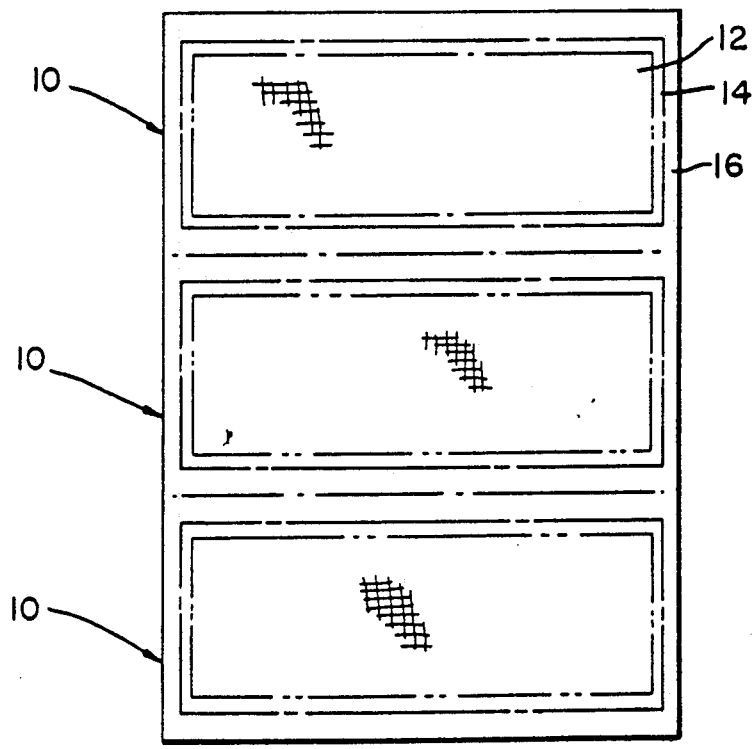
FIG. 2 is a fragmentary front elevation view of a series of bags prior to their separation.
Figure 3:
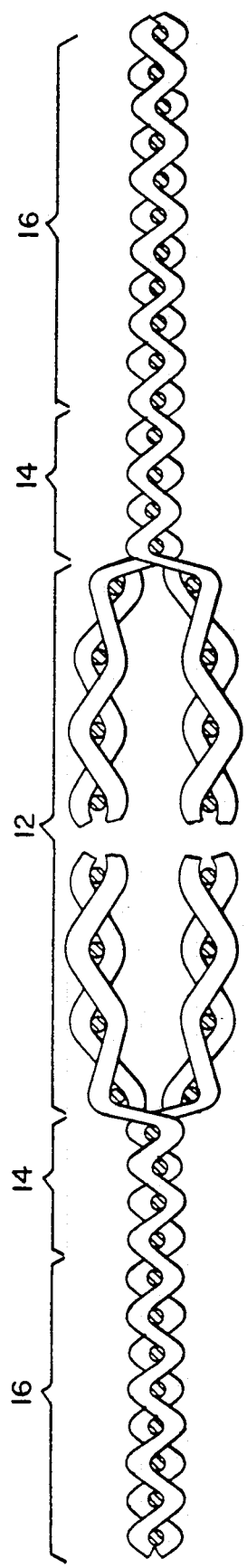
FIG. 3 is a fragmentary sectional view, to a greatly enlarged scale, taken along the line 3—3 of FIG. 1.
Figure 4:
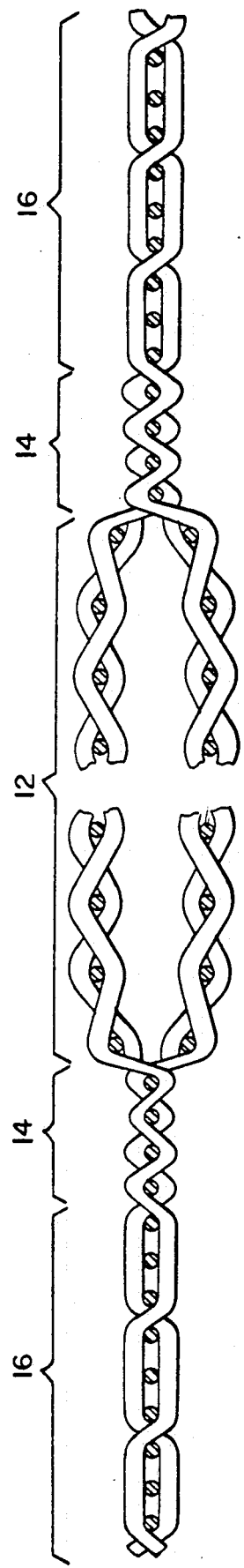
FIG. 4 is a fragmentary sectional view, to a greatly enlarged scale, taken along the line 4—4 of FIG. 1.
Figure 5:
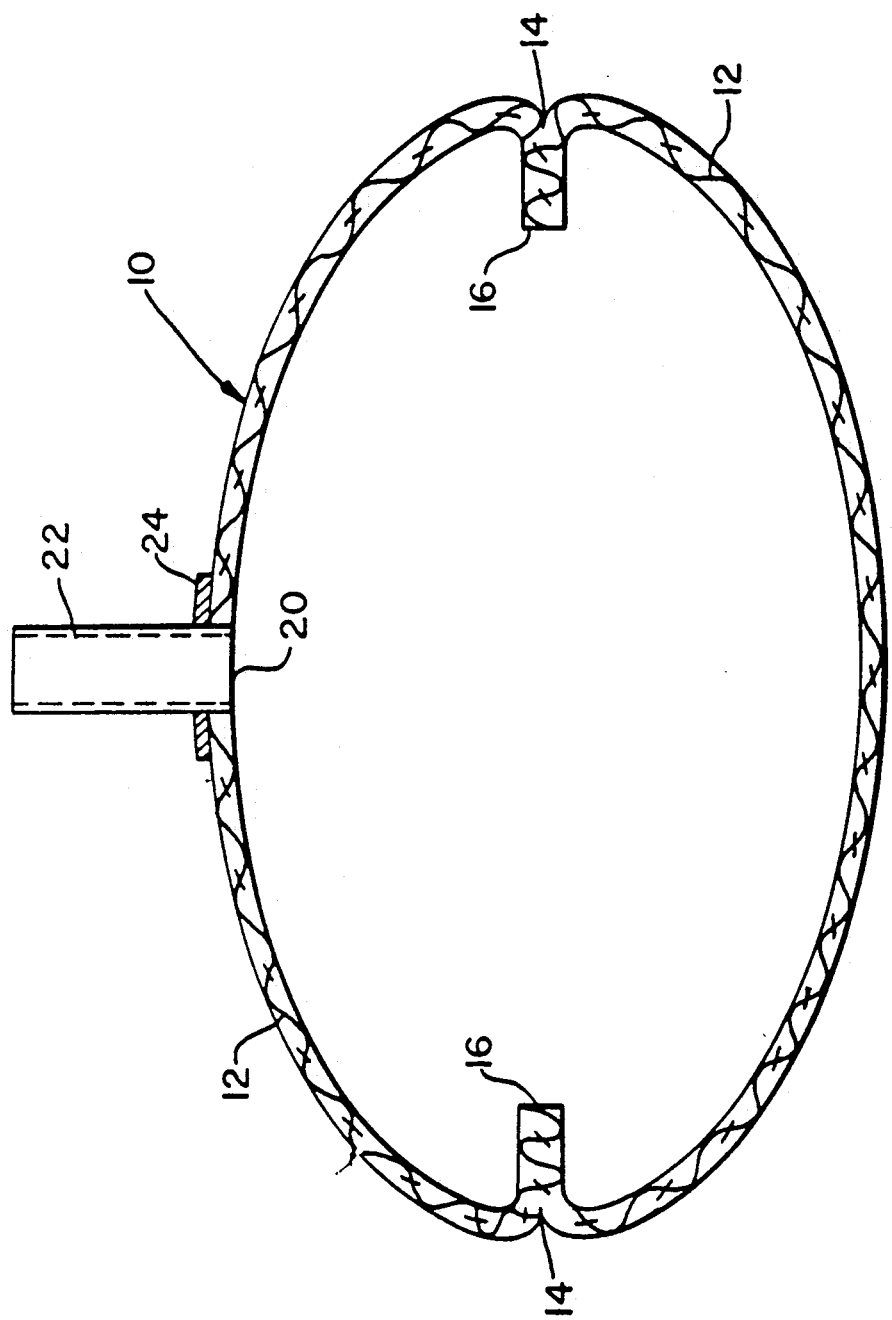
FIG. 5 is a sectional view of an airbag according to the present invention.

Referring now to the drawing, and in particular to FIG. 1 thereof, therein illustrated is a seamless bag of integral, unitary, one-piece woven construction according to the present invention, generally designated by the reference numeral 10. The bag 10 includes a pair of opposed panels 12 of substantial area, a single intermediate margin 14 of slight width joining the peripheries of the opposed panels 12 together, and a single outer margin 16 of substantially greater width than the intermediate margin 14 extending about the periphery of the intermediate margin 14.

It will be appreciated that the relative sizes of the panels 12, intermediate margins 14 and outer margins 16 are not to scale in the drawing, and that the relative sizes of margins 14, 16 have been exaggerated for expository purposes.

The bag is preferably woven of 440 denier yarn, such as polyester or nylon. Polyester is preferred because of its stability over time at elevated temperatures, while nylon exhibits a degradation over time at elevated temperatures. This is an important factor as, prior to being called upon to perform, an airbag may be stored for several years in a car left exposed to the sun. A 440/100/2Z yarn is preferred for the warp, and a 440/100/0 yarn is preferred for the weft or fill, although other yarns may be used.

The panels 12 are formed in a plain or 1×1 weave of a first yarn density or count. Preferably, each opposed panel 12 is of substantially rectangular configuration and has an area Y×X of about 100.6×122.3 cm. in the loom state (about 95.6×118.2 cm. after finishing) to provide a width substantially greater than the width of the outer margin 16. A preferred first yarn density or count for the panels 12 is about 45 picks per inch by about 45 ends per inch (i.e., 45×45), although clearly higher and lower yarn densities or counts may be used so long as the bag meets the specification, including the porosity requirements discussed hereinafter.

The intermediate margin 14 is formed in a plain or 1×1 interweave (so-called because it weaves together or joins the opposed woven panels 12) of a second yarn density. The second yarn density is greater than the first yarn density. Typically the intermediate margin 14 is formed by combining the weave of the two opposed panels 12 and therefore has a second yarn density which is the sum of, and typically exactly twice that of, each panel 12—i.e., twice the first yarn density or 90×90. It will be appreciated, however, that in particular applications it may be desirable to have a second yarn density which is other than the sum of the first yarn densities and this too may be used in the present invention, although typically the cost of weaving the same would be increased due to wasted yarn and extended processing time. The intermediate margin 14 preferably has a width of about 2.0 mm. in both selvage and stitcher (in both the loom state and after finishing) and a total of about 4 picks and 4 ends.

The outer margin 16 is formed in a weave looser than the plain interweave of the intermediate margin 14—i.e., a weave having a lower cover factor. For example, as illustrated, the outer margin 16 is formed in a non-plain weave called a single/triple weave in which each weft or fill extends over 3 warps, under 3 warps, over 3 warps, and so on. Those skilled in the art will appreciate that other non-plain weaves looser than a plain weave may be used instead of the single/triple weave illustrated, such as a double/triple weave, a 2×2 or 3×3 basket weave, a 1×2 or 1×3 twill, a 4 or 5 harness satin, etc. A one/three twill offers a similar float to the single/triple weave and a similar decrease in interlacings, but does not resist combing or windowing (i.e., compaction) as well. The outer margin 16 preferably has a width of about 6.0 mm. in both selvage and stitcher (in both the loom state and after finishing), intermediate the widths of the intermediate margin 14 and the panels 12. The outer margin 16 preferably has a yarn density about equal to the second yarn density of the intermediate margin 14—i.e., about 90×90. As in the case of the intermediate margin 14, the yarn density or count of the outer margin 16 may for particular applications be varied from the second yarn density (that is, the yarn density of the intermediate margin 14).

The provision of the intermediate margin 14 is a critical feature of the present invention. The interweaving of two layers of already dense fabrics (that is, the panels 12) is difficult to do because there is just so much yarn that can be packed into a single plain interwoven layer. Merging the plain weave panels 12 immediately into a single/triple weave margin entails the use of yarns floating over each other, and, while it permits ultra-high yarn densities to be packed in tightly, its looser weave promotes windowing or combing. Such combing or windowing permits hot gases to preferentially flow through the gaps at the interface of the opposed panels and margin and thereby increases the likelihood of melting of the bag yarn in these interface areas. Accordingly, it is critical to the present invention to provide an intermediate margin 14 intermediate the panels 12 and outer margin 16. Despite its very slight width, the tightness of the intermediate margin 14 essentially precludes deleterious compaction (i.e., windowing or combing) of the outer margin 16 during explosive inflation of the bag with gas. Because the resultant bag has a uniform permeability about the interface between the panels 12 and margins 14, 16, there is no concentration of the hot gases at stress points along the interface to cause melting failures. On the other hand, it should also be appreciated that the intermediate margin 14 is of such a tightness that it could not easily be woven to any greater width, and, if so woven, would likely present problems in terms of the bag's flexibility, weight, and the like.

The bag of the present invention is woven using an electronic or computer-controlled dobby or harness regulator capable of changing from one weave pattern to another in midstream. Depending upon the particular equipment available, a series of single bags in a continuous column may be woven on a given dobby with each adjacent pair of bags being joined on a common side of their outer margins—i.e., sharing a common stitcher having a width of about 12 mm. Optionally there may be repeats sharing a common side of their outer margins—i.e., sharing a common selvage having a width of 12 mm. Eventually the various bags are separated using a hot knife, hot wire, or other cutting means to divide the common stitcher, each divided common stitcher portion then forming part of an outer margin 16 for a respective bag. If two or more series of bags 10 in a row are woven on a given dobby, with two adjacent series sharing a common selvage, eventually the common selvage is divided by a hot knife or the like to provide part of the outer margin 16 for each series.

Because a conventional cut and sewn bag for use in an airbag contains about a 2.5 cm. margin from the sewing line to the edge of each layer (i.e., to the periphery of the bag), and the seamless woven bag of the present invention has a total margin of only about 8.0 mm. (an outer margin 16 of only 6.0 mm inch and an intermediate margin 14 of only 2.0 mm), the bag of the present invention uses substantially less yarn. Furthermore, as there is no sewing or stitching required, the labor costs are substantially less for a bag of the present invention than for a conventional cut and sewn bag. Additionally, because the looms on which the bags of the present invention are woven can be set up identically to ensure maximum uniformity, there is a great uniformity of bag construction, and, accordingly a simplified inspection procedure can be utilized, resulting in a savings in costs related to quality control.

In order to provide a suitable airbag, the bag 10 must meet predetermined permeability or porosity standards. While these standards will vary from country to country and company to company, and even depending upon whether the bag is for the passenger's side (e.g., 8 CFM) or the driver's side (e.g., 2 CFM), the bags according to the present invention can meet standards as high as a Frazier porosity of less than 2 cubic feet per minute. Typically, the bags are heat cured (e.g., at 358° F.) after weaving in order to obtain a slight shrinkage of about 10% in the bag dimensions (from an area $Y' \times X'$ of about $102.2 \times 123.9$ cm. overall to about $97.2 \times 119.9$ cm overall) and, accordingly, a decrease in the porosity thereof.

A bag according to the present invention made of polyester exhibits the following properties as tested by Federal Standard 191: a thread count or yarn density of 43/inch warp and 47/inch filling (Method 5050); a tensile strength of 375.0 pounds warp and a 508.3 pounds filling (Method 5100, grab 1 inch); an elongation of 27.5% warp and 26.3% filling (Method 5100, grab 1 inch); a tear strength of 71.7 pounds warp and 97.3 pounds filling (Trapezoidal Method); a burst strength of 830 psi (Method 5122, Mullen); an air permeability of 1.22 CFM (Method 5450); a thickness of 0.0104 inches (Method 5030); a weight of 5.59 ounces per square yard (Method 5041) and a seam strength of 211.3 pounds across the selvage and 212.5 pounds across the stitcher (ASTM D434-75, the fabric being tested to the point of rupture and the force required to break the seam recorded). After the seam strength test, a visual examination of the sample is made to determine the amount of slippage, if any did occur. The slippage does not exceed ⅛ of an inch.

After a bag 10 has been woven and separated from any adjacent bag, an aperture 20 (typically of a rectangular configuration) is cut in the center of one of the panels 12 in order to permit the other panel 12 to be pulled through the aperture, thereby reversing or inverting the bag with the intermediate and outer margins 14, 16 now neatly protected and sealed within the bag, where they are less likely to catch on anything or cut anyone upon inflation of the bag. An aperture 20 about $7.6 \times 15.2$ cm. is preferred, although larger and smaller apertures of the same or different configurations may be used. Conventional inflation means 22 are then placed in gaseous communication through the aperture with the interior of the inverted bag for inflating the inverted bag upon the occurrence of an accident, the inflation means being secured to the inverted bag by conventional means. As is conventional in the art, the inflation means is typically sodium azide and has an electrical igniter system, so that the explosively produced gas is nitrogen. If desired, a reinforcing ring 24 is stitched onto the apertured panel of the inverted bag about the aperture. Thus a single aperture serves both as the aperture enabling inversion of the bag and as the aperture for communication with the inflation means.

The bag of the present invention is particularly well suited for use as the passenger side airbag rather than the driver side airbag, the latter preferably being of circular (rather than rectangular) cross section so that the turning of the wheel in which the airbag is housed does not vary the configuration of the bag presented to the driver upon inflation. However, the bag of the present invention may also be woven using panels, intermediate margins, and outer margins of circular configuration, albeit typically at lower production rates, so that the bag of the present invention is also capable of use in a driver side airbag provided that it meets the requisite porosity standard.

Now that the preferred embodiments of the present invention have been shown and described in detail, various modifications and improvements thereon will be readily apparent to those skilled in the art. Accordingly, the appended claims are to be construed broadly and in a manner consistent with the spirit and scope of the invention described herein.

I claim:

1. A bag suitable for use in an airbag comprising: a seamless bag of integral, unitary, one-piece woven construction, said bag defining:
   (i) a pair of opposed panels of substantial area formed in a plain weave of a first yarn density;
   (ii) a single intermediate margin of slight width joining the peripheries of said opposed panels together, said intermediate margin being formed in a plain interweave of a second yarn density greater than said first yarn density; and
   (iii) a single outer margin of substantially greater width than said intermediate margin extending about the periphery of said intermediate margin, said outer margin being formed in a weave looser than said plain interweave.

2. The bag of claim 1 having a Frazier porosity of less than 8 cubic feet per minute.

3. The bag of claim 1 wherein said second yarn density is twice said first yarn density.

4. The bag of claim 1 wherein said first yarn density is about $45 \times 45$ and said second yarn density is about $90 \times 90$.

5. The bag of claim 1 wherein said outer margin is formed in a non-plain weave.

6. The bag of claim 5 wherein said outer margin has a yarn density about equal to said second yarn density.

7. The bag of claim 1 wherein said outer margin is a single/triple weave.

8. The bag of claim 1 wherein each of said opposed panels is of substantially rectangular configuration and has a width substantially greater than the width of said outer margin.

9. The bag of claim 1 wherein said outer margin has a width of about 6.0 mm and said intermediate margin has a width of about 2.0 mm.

10. The bag of claim 1 wherein said intermediate margin has a total of about 4 ends and 4 picks.

11. The bag of claim 1 wherein said bag is devoid of any sewing or stitching.

12. The bag of claim 1 in inverted form and additionally including inflation means in gaseous communication with the interior of said inverted bag for inflating said inverted bag.

13. A bag suitable for use in an airbag, comprising:
a seamless bag of integral, unitary, one-piece woven construction, devoid of any sewing or stitching and having a Frazier porosity of less than 8 cubic feet per minute, said bag defining:
(i) a pair of opposed panels of substantial area formed in a plain weave of a first weave of about 45×45, each of said opposed panels being of substantially rectangular configuration,
(ii) a single intermediate margin having a total of about 4 picks and 4 ends and a width of about 2.0 mm. joining the peripheries of said opposed panels together, said intermediate margin being formed in a plain interweave of about 90×90, and
(iii) a single outer margin having a width of about 6.0 mm extending about the periphery of said intermediate margin, said outer margin being formed in a non-plain single/triple weave of about 90×90 looser than said plain interweave.

14. An airbag comprising:
(A) an inverted seamless bag of integral, unitary, one-piece woven construction having a Frazier porosity of less than 8 cubic feet per minute, said bag prior to inversion defining:
(i) a pair of opposed panels of substantial area formed in a plain weave of a first count,
(ii) a single intermediate margin of slight width joining the peripheries of said opposed panels together, said intermediate margin being formed in a plain interweave of a second count greater than said first count; and
(iii) a single outer margin of substantially greater width than said intermediate margin extending about the periphery of said intermediate margin, said outer margin being formed in a weave looser than said plain interweave; and
(B) inflation means in gaseous communication with the interior of said inverted bag for inflating said inverted bag.

15. The airbag of claim 14 wherein said inflation means is in gaseous communication with the interior of said inverted bag through an aperture formed in one of said opposed panels.

16. The airbag of claim 14 wherein said second count is substantially double said first count, and said outer margin is a non-plain weave of said second count.

17. A method of making a bag for an airbag, comprising the steps of:
(A) weaving a seamless bag of integral, unitary, one-piece woven construction having a Frazier porosity of less than 8 cubic feet per minute, said bag defining:
(i) a pair of opposed panels of substantial area formed in a plain weave of a first yarn density; and
(ii) a single intermediate margin of slight width joining of the periphery of said opposed panels together, said intermediate margin being formed in a plain weave of a second yarn density greater than said first yarn density; and
(iii) a single outer margin of substantially greater width than said intermediate margin extending about the periphery of said intermediate margin, said outer margin being formed in a weave looser than said plain weave.

18. The method of claim 17 wherein a plurality of the bags are woven, with each of the bags being connected to at least one other bag by a common side of their respective outer margins, and each bag is then separated from the at least one other bag by cutting the common side of their respective outer margins.

19. A method of making an airbag, comprising the steps of:
(A) making a bag according to claim 17;
(B) inverting the bag; and
(C) positioning inflation means in gaseous communication with the interior of the inverted bag for inflating the inverted bag.

* * * * *